United States Patent [19]
Sumi

[11] Patent Number: 5,523,680
[45] Date of Patent: Jun. 4, 1996

[54] WHEEL SPEED SENSOR THAT ACCURATELY SENSES VARIATIONS IN MAGNETIC RELUCTANCE

[75] Inventor: Takashi Sumi, Aichi-ken, Japan

[73] Assignee: Toyota Jidosha Kabushiki Kaisha, Aichi-ken, Japan

[21] Appl. No.: 253,289

[22] Filed: Jun. 3, 1994

[30] Foreign Application Priority Data

Jun. 15, 1993 [JP] Japan ..................... 5-143808

[51] Int. Cl.⁶ .................. G01P 3/48; B60T 8/32
[52] U.S. Cl. ............. 324/174; 324/207.25; 384/448; 310/168; 188/181 R
[58] Field of Search ................ 324/173–175, 324/207.15, 207.22–207.25; 384/448; 310/168; 188/181 R

[56] References Cited

U.S. PATENT DOCUMENTS

| | | | |
|---|---|---|---|
| 3,473,120 | 10/1969 | Ruof | 324/174 X |
| 3,551,712 | 12/1970 | Jones et al. | 324/174 |
| 3,683,219 | 8/1972 | Kruse | 324/174 X |
| 3,805,161 | 4/1974 | Bayha et al. | 324/174 X |
| 3,960,248 | 6/1976 | Tribe | 324/174 X |
| 4,027,753 | 6/1977 | Lantz | 324/174 |
| 4,157,482 | 6/1979 | Kakinuma | 324/174 X |
| 4,318,018 | 3/1982 | Kennedy | 324/174 X |
| 4,970,462 | 11/1990 | Richmond | 324/174 |

FOREIGN PATENT DOCUMENTS 2161014 6/1973 Germany.
55-17173 4/1980 Japan.

*Primary Examiner*—Sandra L. O'Shea
*Assistant Examiner*—Jay M. Patidar
*Attorney, Agent, or Firm*—Oliff & Berridge

[57] ABSTRACT

A wheel speed sensor having a simple construction outputs a signal used for measuring the rotational speed of a wheel without noise due to displacement of rotating members. A housing is provided on a carrier member of a suspension mechanism, the carrier member carrying a bearing rotatably supporting a wheel shaft of the wheel. At least one fixed tooth is protrusively formed on an inner surface of the housing. An annular coil is arranged inside the housing. A rotatable yoke member is accommodated in the housing and is rotatable together with the wheel shaft. The rotatable yoke member comprises a shaft inserted into a center hole of the annular coil and an extending member extending in a radial direction. The shaft extends through the center hole of the annular coil so that a first gap is formed between an end of the shaft and a wall of the housing. At least one rotatable tooth is formed on an outer periphery of the extending member so that a second gap is formed between the rotatable tooth and the fixed tooth. A magnet is provided as a part of the shaft. Magnetic flux generated by the magnet forms a loop surrounding the annular coil by passing through the shaft, the extending member, the second gap, the housing and the first gap, so that a voltage signal having a periodical change corresponding to a rotational speed of the wheel is generated in the annular coil.

15 Claims, 4 Drawing Sheets

WHEEL SPEED SENSOR THAT ACCURATELY SENSES VARIATIONS IN MAGNETIC RELUCTANCE

BACKGROUND OF THE INVENTION

1. Field of the Invention

The present invention generally relates to a wheel speed sensor used for vehicles, and more particularly to a wheel speed sensor adapted to generate signals corresponding to the rotating speed of a vehicle wheel.

2. Description of the Related Art

Generally, wheel speed sensors are used for measuring the rotating speed of a driving shaft of a driving wheel. In the conventional wheel speed sensors, one pulse signal is generated for each single rotation of the driving shaft, and it is sufficient to roughly measure vehicle speed when the vehicle is driven under substantially constant driving conditions.

However, when wheel sensors are provided for measuring rotating speed of wheels in order to use the measured rotating speed for improving driving performance and safety of vehicles, a more accurate measurement of rotating speed of wheels is required.

Rotating speed of wheels of an automobile varies from wheel to wheel due to variation of slip ratio. For example, if an excessive driving torque is applied to the driving wheels, the rotating speed of the driving wheels is higher than that of wheels other than the driving wheels. Additionally, if one of the wheels is locked due to an excessive braking force, the rotating speed of that particular wheel is lower than that of the other wheels.

If the difference in rotating speed among the wheels is measured, various types of vehicle driving condition information can be obtained so as to use the information for controlling the operation of the vehicle. Therefore, in order to measure the difference in rotating speed among the wheels, it is required to measure the rotating speed of wheels with high accuracy.

Recently, many wheel speed sensors have been developed. Those wheel speed sensors use basically a rotatable member rotating together with a wheel and a measuring unit for measuring the rotation speed of the rotatable member. One example of such wheel speed sensors utilizes a magnet and a Hall element fixed to the rotatable member. In the example, the rotatable member is formed as a disk, and a plurality of magnets are circumferentially provided on a side surface of the disk apart a predetermined distance from each other. The Hall element is provided in a predetermined position on a stationary member so as to detect magnetic flux crossing the Hall element.

However, the above-mentioned example of the wheel speed sensor has a problem in that positioning of the magnets and the Hall element requires extremely high accuracy. That is, the radial distance from the center of rotation to the Hall element must accurately correspond to the radial distance from the center of rotation to each of the magnets. Additionally, in order to maintain an appropriate intensity of magnetic flux applied to the Hall element, the gap between the Hall element and each of the magnets must be strictly controlled, the gap being formed in the axial direction of the rotation. Accordingly, in the above-mentioned example, a high accuracy is required in part dimensions as well as assembly of parts.

The Japanese Utility-Model Publication No. 55-17173 discloses a wheel speed sensor in which a part of the above-mentioned problems is eliminated. FIG. 1 shows a structure of the wheel speed sensor described in the Japanese Utility-Model Publication No. 55-17173. As shown in FIG. 1, the wheel speed sensor 1 comprises a housing 2, a fixed shaft 3, a detecting coil 4, a magnetic member 5, a fixed tooth member 6, a magnet 7 and a rotatable tooth member 8. The housing made of non-magnetic material is mounted on an outer surface of the fixed shaft 3. The detecting coil 4 is formed of an annular shape, and is situated inside the housing 2. The magnet 7 is also situated inside the housing 2 between the detecting coil 4 and a wall of the housing 2. One end of the magnet 7 is in contact with the magnetic member 5, and the other end is in contact with the fixed tooth member 6. At one end of the fixed tooth member 6, there are formed fixed teeth 6a facing rotatable teeth 8a formed on the rotatable tooth member 8. The rotatable tooth member 8 rotates together with a wheel (not shown in the figure) relative to the fixed shaft 3.

In the above-mentioned structure of the wheel speed sensor 1, magnetic flux generated by the magnet 7 forms a loop surrounding the detecting coil 4 as shown by dashed lines in the figure. That is, the magnetic flux passes through gaps formed between the fixed teeth 6a and the rotatable teeth 8a. As the rotatable teeth 8a rotate due to the rotation of the wheel, the lengths of the gaps between the fixed teeth 6a and the rotatable teeth 8a vary, resulting in variation of magnetic reluctance. Accordingly, the detecting coil 4 of the wheel speed sensor 1 generates a varying voltage signal due to the variation of the magnetic reluctance corresponding to the rotation speed of the wheel.

The wheel speed sensor 1 requires accuracy only in forming the length of the gap between the fixed teeth 6a and the rotatable teeth 8a because deflection of the position of the both teeth hardly effects the magnetic reluctance. That is, the wheel speed sensor 1 requires only that the radial dimension of the fixed teeth member 6 and the rotatable tooth member 8 be accurately controlled.

However, in the wheel speed sensor 1, since the rotatable tooth member 8 must slidably rotate relative to the fixed shaft 3, the rotatable tooth member 8 and the fixed shaft 3 must be formed as separate parts. Accordingly, a small gap is inherently formed between the inner diameter of the rotatable teeth member 8 and the outer diameter of the fixed shaft 3. Since the length of the gap formed at either end of the diameter of the fixed shaft 3 varies as the rotatable tooth member 8 rotates, the magnetic reluctance. This fluctuation generates noise in the output signal from the detecting coil 4. Therefore, there is a problem in that the noise due to the variation of the length of the gap may cause an error in measuring the rotating speed of the rotatable teeth member 8.

SUMMARY OF THE INVENTION

It is a general object of the present invention to provide an improved and useful wheel speed sensor in which the above-mentioned disadvantages are eliminated.

A more specific object of the present invention is to provide a wheel speed sensor having a simple construction with high accuracy in measuring the rotational speed of a wheel.

Another object of the present invention is to provide a wheel speed sensor which can output a signal used for measuring the rotational speed of a wheel without noise due to displacement of rotating members.

In order to achieve the above-mentioned object, there is provided according to the present invention, a wheel speed sensor used for a vehicle having a wheel suspension mechanism, the wheel speed sensor comprising:

a housing provided on a carrier member of the suspension mechanism, the carrier member carrying a bearing rotatably supporting a wheel shaft of the wheel;

at least one fixed tooth protrusively formed on an inner surface of the housing;

an annular coil arranged inside the housing;

a rotatable yoke member, accommodated in the housing and rotatable together with the wheel shaft, comprising a shaft inserted into a center hole of the annular coil and an extending member extending in a radial direction, the shaft extending through the center hole of the annular coil so that a first gap is formed, along the direction of the rotational axis, between an end of the shaft and a wall of the housing, at least one rotatable tooth being formed on an outer periphery of the extending member so that a second gap is formed between the rotatable tooth and the fixed tooth, a magnet being provided as a part of the shaft.

In the above-mentioned invention, magnetic flux generated by the magnet forms a loop surrounding the annular coil by passing through the shaft, the extending member, the second gap, the housing and the first gap, so that a voltage signal having a periodical change corresponding to a rotational speed of the wheel is generated in the annular coil.

According to the above-mentioned structure of the wheel speed sensor according to the present invention, since there is formed no sliding gap between the rotatable member and the fixed member, there occurs no fluctuation of the magnetic reluctance for the magnetic flux formed around the detecting coil. Therefore, a stable output signal without having a noise can be obtained, thus an accurate measurement of the rotational speed of a wheel is realized with a simple construction.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to FIG. 2, of an embodiment of a wheel speed sensor according to the present invention.

Figure 1:
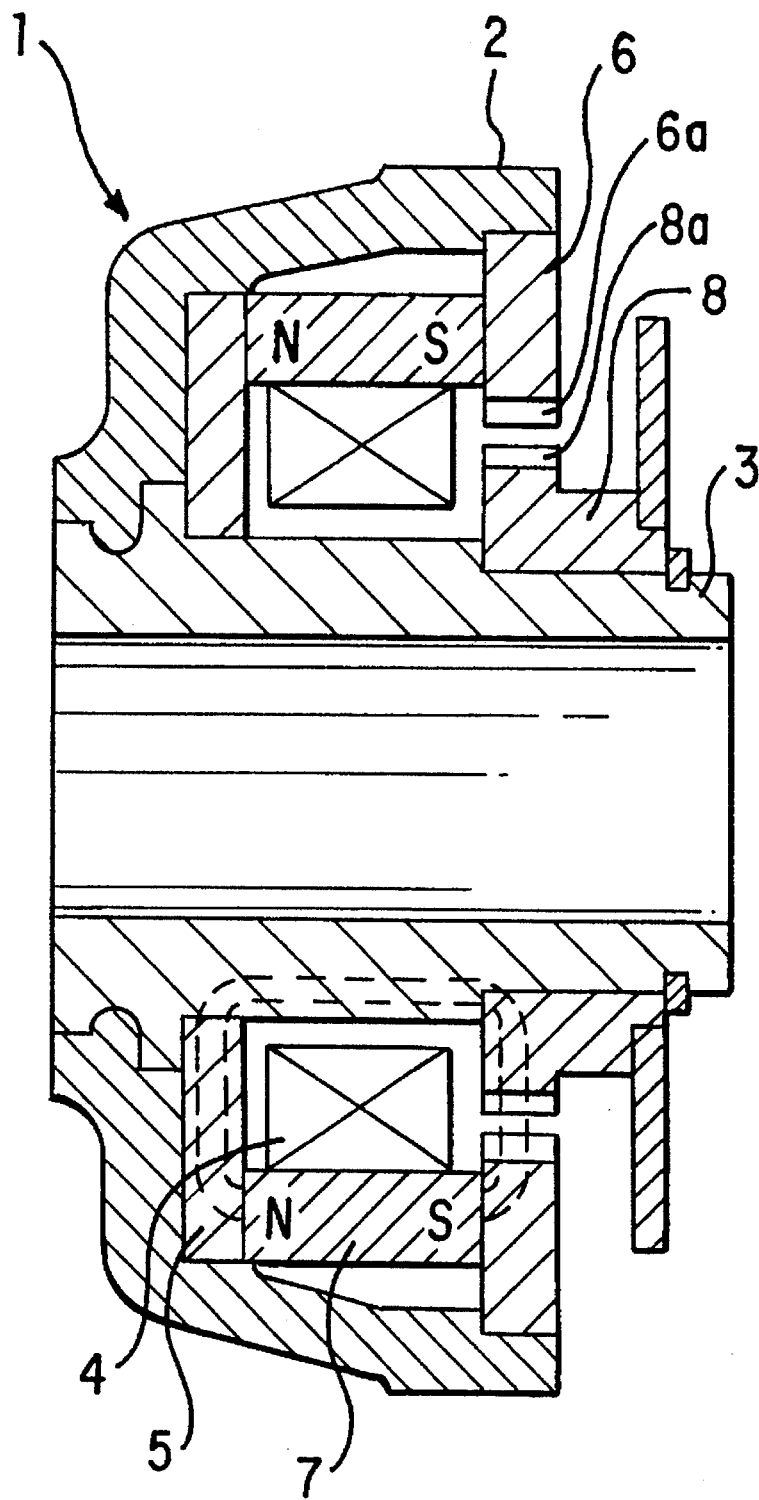
FIG. 1 is a cross sectional view of an example of conventional wheel speed sensors.
Figure 2:
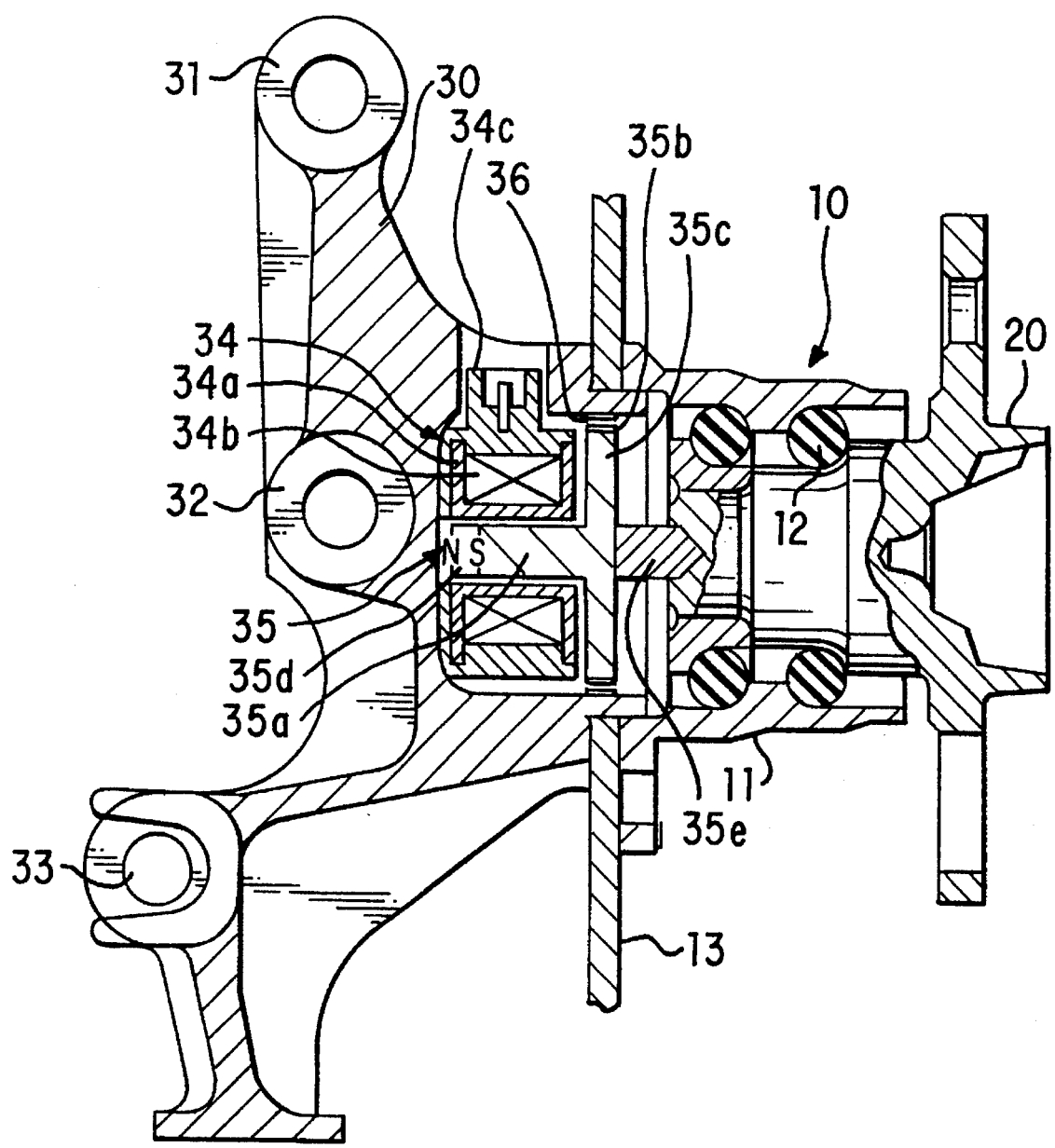
FIG. 2 is a cross sectional view of an embodiment of a wheel speed sensor according to the present invention.

In FIG. 2, a unit bearing 10 supports a wheel shaft 20 fixed to a wheel (not shown in the figure), the rotating speed of the wheel being measured. The bearing 10 is mounted to a carrier 30 which is connected to a suspension mechanism not shown in the figure. Accordingly, the wheel shaft 20 is rotatable relative to the carrier 30.

The unit bearing 10 comprises a plurality of balls 12 inside a bearing case 11. One end of the bearing case 11 is flanged and mounted to the carrier 30 via a member 13 used as a part of a braking mechanism.

The carrier 30 has a fixing portions 31, 32 and 33 at which the carrier 30 is fixed via bushes to a linkage member comprising the suspension mechanism. Accordingly, the carrier 30 serves as a mounting member for the wheel as well as a housing of the wheel speed sensor. The carrier 30 is made of a magnetic material such as cast iron, and a cavity opening toward the unit bearing 10 is formed inside the carrier 30. Inside the carrier 30 are provided a detecting coil 34 and a rotatable yoke 35.

The detecting coil 34 comprises a bobbin 34a made of a non-magnetic material and a wire wound on the bobbin 34a. The outer periphery of the detecting coil 34 is molded with a connector 34c formed at a portion of the molded part, which connector 34c connects the wire to an external electric circuit.

The rotatable yoke 35 comprises a rotatable shaft 35a, a rotatable plate 35c, a magnet 35d and a connecting shaft 35e. These parts are integrally formed with each other. The magnet 35d is provided at one end of the rotatable shaft 35a made of magnetic material, and the rotatable plate 35c, which is also made of magnetic material is provided at the other end of the rotatable shaft 35a. There are provided rotatable teeth 35b formed on an outer periphery of the rotatable plate 35c. The connecting shaft 35e is made of a non-magnetic material, and extends from a surface of the rotatable plate 35c on the opposite side of the rotatable shaft 35a. The connecting shaft 35e is connected to an end of the wheel shaft 20 so that the rotational axis of the rotatable yoke 35 coincides with the rotational axis of the wheel shaft 20.

As shown in FIG. 2, in a state where the bearing unit 10, the wheel shaft 20 and the carrier 30 are assembled together, the rotatable yoke 35 is supported inside the cavity of the carrier 30. When the wheel shaft 20 rotates, the rotatable yoke 35 also rotates without interfering with other parts inside the cavity of the carrier 30.

On the inner surface of the cavity of the carrier 30, there are provided fixed teeth 36 protruding from the inner surface of the cavity along a circumference so that the fixed teeth 36 face the rotatable teeth 35b of the rotational yoke 35. Small gaps are formed between a top surface of each of the fixed teeth 36 and a top surface of each of the rotatable teeth 35b. When the rotatable yoke 35 rotates in the cavity of the carrier 30, the length of the gap, along a circumference, formed between each of the rotatable teeth 35b and each of the fixed teeth 36 is varied. That is, the length of the gap is utmost when each of the rotatable teeth 35b directly faces to each of the fixed teeth 36, and the length is least in a state where each of the rotatable teeth 35b is positioned between adjacent fixed teeth 36. Accordingly, the length of the gap is periodically varied corresponding to the rotating speed of the rotatable yoke 35.

The magnet 35d provided at the end of the rotatable yoke generates magnetic flux. Supposing the magnet 35d is magnetized so that the S-pole is formed on the rotatable shaft side and the N-pole faces to a wall of the cavity of the carrier 30 as shown in FIG. 2, the magnetic flux forms a loop surrounding the detecting coil 34. That is, the magnetic flux traverses the loop formed through the rotatable shaft 35a, the rotatable plate 35c, the gap formed between the rotatable teeth 35b and the fixed teeth 36, a portion of the carrier 30 and the gap formed between the wall of the cavity of the carrier 30 and the magnet 35d.

As mentioned above, since the rotatable shaft 35a, the rotatable plate 35c and carrier 30 are made of a magnetic material, and the surrounding parts, namely the connecting shaft 35e and the periphery of the detecting coil 34, are made of a non-magnetic material, a well defined loop of the magnetic flux path is formed around the detecting coil 34. The magnetic reluctance for the magnetic flux path is determined by the sum of the reluctance of each of the elements forming the loop, namely the rotatable shaft 35a, the rotatable plate 35c, the gap formed between the rotatable teeth 35b and the fixed teeth 35' a portion of the carrier 30 and the gap formed between the wall of the cavity the carrier 30 and the magnet 35d. The reluctances of all of those elements are determined by their materials, shapes and dimensions, and thus the reluctances are not changed due to rotation of the rotatable yoke 35 except for the gap between the rotatable teeth 35b and the fixed teeth 36 as the length of the gap is varied due to the rotation of the rotatable yoke 35. That is, the reluctance for the magnetic flux loop varies periodically in accordance with the variation of the reluctance between the rotatable teeth 35b and the fixed teeth 36 due to the rotation of the rotatable yoke 35.

The density of the magnetic flux passing through the loop is determined by the density of the magnetic flux generated by the magnet 35d and the reluctance of the magnetic flux loop. Since the density of the magnetic flux generated by the magnet 35d is constant, when the reluctance is varied as mentioned above, the density of the magnetic flux passing through the magnetic flux path is varied with a period corresponding to the rotational speed of the rotatable yoke 35, that is the rotational speed of the wheel shaft 20.

Due to the periodical change in the density of the magnetic flux surrounding the detecting coil 34, a periodical electromotive force is generated in the detecting coil 34, and thus a voltage corresponding to the electromotive force is measured at the connector 34c of the detecting coil 34. The magnitude of the voltage varies with the same period as that of the period of the change in the density of the magnetic flux surrounding the detecting coil 34. That is, the period of the voltage variation corresponds to the rotational speed of the wheel shaft 20. Therefore, by obtaining the period of the voltage variation generated by the detecting coil 34, the rotational speed of the wheel is measured with high accuracy.

Figure 3A:
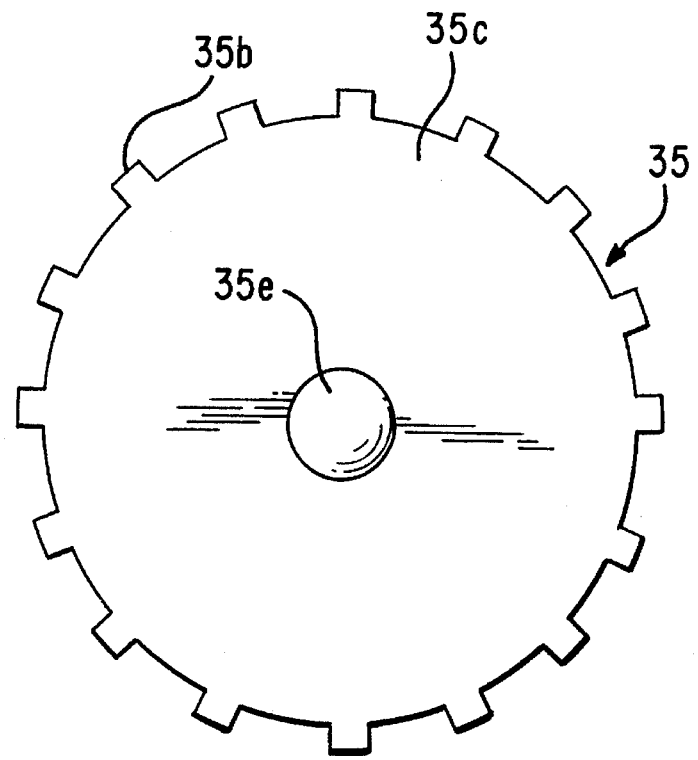
FIG. 3A is a side view of the rotatable yoke shown in FIG. 2.

In one example of the rotational yoke 35, the rotational plate is formed, as shown in FIG. 3A, in a circular shape, and sixteen rotatable teeth 35b are formed on the periphery thereof. If the number of fixed teeth 36 is also sixteen, a voltage signal having sixteen periods per one rotation of the wheel is output from the detecting coil 34.

Figure 3B:
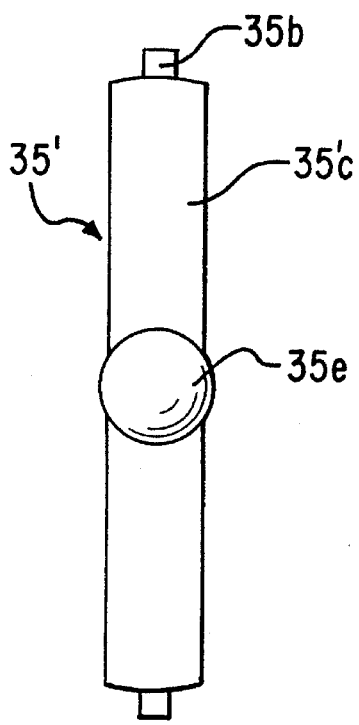
FIG. 3B is a side view of a variation of the rotatable yoke shown in FIG. 3A.

It should be noted that if the fixed teeth 36 are provided over the entire circumference of the inner surface of the cavity of the carrier 30, it is not needed to provide the rotatable teeth 35b over the entire periphery of the rotatable plate 35c. For example, as shown in FIG. 3B, the rotatable plate 35c' of the rotatable yoke 35' may be formed in a rectangular shape, and a single rotatable tooth 35b may be provided at either end thereof.

Additionally, the number of the rotatable teeth 35b and the number of the fixed teeth 36 are not limited to a specific number. If more accurate measurement of the rotational speed is desired, the number of teeth may be increased, and if less accurate measurement is sufficient, the number of teeth may be decreased.

In the above-mentioned construction of the wheel shaft supporting mechanism, the carrier 30 is always necessary for mounting the wheel on a suspension mechanism of a vehicle. Accordingly, the cavity which accommodates the detecting coil 34 and the rotatable yoke 35 can be formed in the carrier 30, and thus the carrier 30 can be used as a housing of the wheel speed sensor. Therefore, compared with the conventional wheel speed sensor having a housing independently formed of a non-magnetic material, a production efficiency of the wheel speed sensor according to the present invention is improved, and manufacturing cost is reduced due to decrease in the number of parts.

Additionally, in the wheel speed sensor according to the present invention, since the rotational shaft 35a, the rotational plate 35c and the rotatable teeth 35b are integrally formed, the magnetic reluctance from the magnet 35d to the rotatable teeth 35b is not varied. Further, since the gap between the magnet 35d and the wall of the cavity of the carrier 30 is formed along a direction of the rotational axis of the rotatable yoke 35, length of the gap in a radial direction, which length is a distance between the magnet 35d and the wall of the cavity of the carrier 30, is, constant even when the rotational yoke 35 is rotated, and thus the reluctance for the gap is maintained constant, in contrast to the gap formed between the rotatable member and the fixed shaft in the above-mentioned conventional wheel speed sensor. Therefore, less noise due to the construction of the wheel speed sensor is generated as compared to the conventional wheel speed sensor.

Further, the positional relationship between the rotatable teeth 35b and the fixed teeth 36 in the wheel speed sensor according to the present invention is determined according to the concentricity between the connecting shaft 35e, the wheel shaft 20 and the cavity of the carrier 30. The concentricity of these parts can be achieved with relatively easy assembly, and thus a gap having a desired length in a radial direction can be easily obtained without performing a special assembly of the wheel speed sensor.

Figure 4:
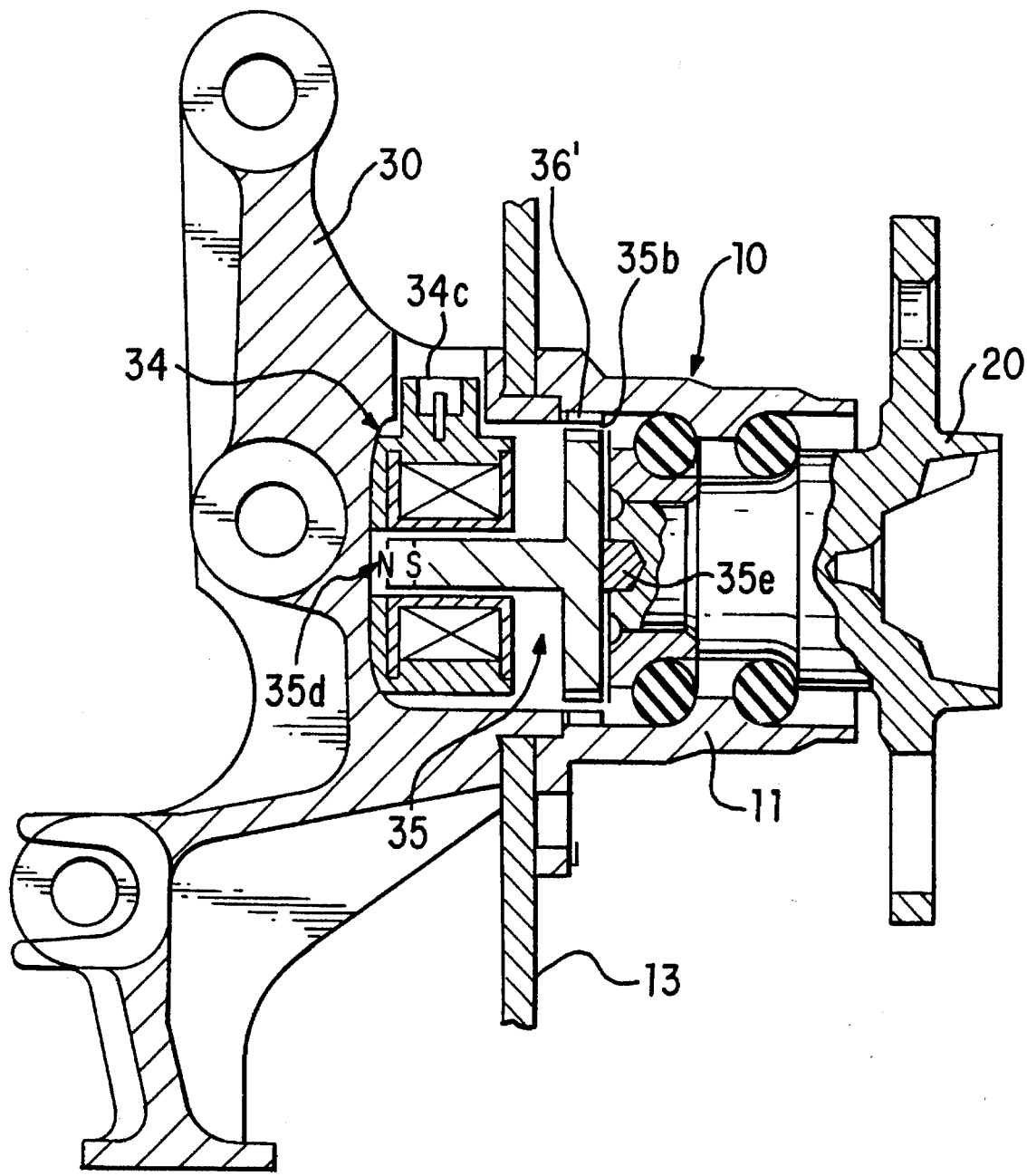
FIG. 4 is a cross sectional view of another embodiment of a wheel speed sensor according to the present invention.

A description will now be given, with reference to FIG. 4, of another embodiment of a wheel speed sensor according to the present invention. In FIG. 4, parts that are the same as the parts shown in FIG. 2 are given the same reference numerals, and descriptions thereof will be omitted.

In the embodiment shown in FIG. 4, the fixed teeth 36' corresponding to the fixed teeth 36 are formed on an inner surface of the bearing case 11, while the fixed teeth 36 of the embodiment shown in FIG. 2 are formed on the inner surface of the cavity of the carrier 30. In this case, the bearing case 11 must be also made of magnetic material. However, the positional relationship between the rotatable teeth 35b and the fixed teeth 36' in the present embodiment is determined according to the concentricity between the connecting shaft 35e and the wheel shaft 20. That is, fitting accuracy between the cavity of the carrier 30 and the bearing case 11 does not affect the positional relationship between the rotational teeth 35b and the fixed teeth 36'. Therefore, a more accurate gap between the rotatable teeth 35b and fixed teeth 36' can be achieved as compared to the embodiment of FIG. 2.

The present invention is not limited to the specifically disclosed embodiments, and variations and modifications may be made without departing from the scope of the present invention.

What is claimed is:

1. A wheel speed sensor used for a vehicle having a wheel suspension mechanism, said wheel speed sensor comprising:

a housing made of a magnetic material provided on a carrier member of said suspension mechanism, said carrier member carrying a bearing rotatably supporting a wheel shaft of a wheel;

at least one fixed tooth protrusively formed on an inner surface of said housing;

an annular coil arranged inside said housing;

a rotatable yoke member, accommodated in said housing and rotatable together with said wheel shaft, comprising a shaft inserted into a center hole of said annular coil and an extending member extending in a radial direction, said shaft of said yoke member extending through the center hole of said annular coil so that a first gap is formed, along a rotational axis of the yoke member, between an end of said shaft and a wall of said housing, at least one rotatable tooth being formed on an outer periphery of said extending member so that a second gap is formed between said at least one rotatable tooth and said at least one fixed tooth, a magnet being provided as a part of said shaft of said yoke member, wherein magnetic flux generated by said magnet forms a loop surrounding said annular coil by passing through said shaft of said yoke member, said extending member, said second gap, said housing and said first gap, so that a voltage signal having a periodical change corresponding to a rotational speed of the wheel is generated in said annular coil.

2. The wheel speed sensor as claimed in claim 1, wherein said housing comprises a cavity formed in said carrier member.

3. The wheel speed sensor as claimed in claim 1, wherein said magnet is provided at an end of said shaft of said yoke member adjacent to the wall of said housing.

4. The wheel speed sensor as claimed in claim 1, wherein said rotatable yoke member further comprises a connecting shaft which rigidly connects said rotatable yoke member to said wheel shaft so that said rotatable yoke member is concentric to said wheel shaft.

5. The wheel speed sensor as claimed in claim 4, wherein said connecting shaft is made of a non-magnetic material.

6. The wheel speed sensor as claimed in claim 1, wherein said annular coil comprises a bobbin, made of a non-magnetic material, on which a wire is wound, and an outer periphery of said annular coil is molded with a non-magnetic material.

7. The wheel speed sensor as claimed in claim 1, wherein said extending member is formed in circular shape, and a plurality of rotatable teeth are formed on an outer periphery of said extending member.

8. The wheel speed sensor as claimed in claim 1, wherein said extending member is formed in a rectangular shape, and a single rotatable tooth is formed on either end of said extending member.

9. The wheel speed sensor as claimed in claim 1, wherein said at least one fixed tooth is provided on an inner surface of a case of said bearing, and said case is made of a magnetic material.

10. The wheel speed sensor as claimed in claim 1, wherein the shaft of the yoke member, the extending member, and the at least one rotatable tooth together are formed as one piece.

11. The wheel speed sensor as claimed in claim 1, wherein the shaft of the rotatable yoke member and the extending element are fixed with respect to each other in a direction along the rotational axis of the shaft of the rotatable yoke member.

12. The wheel speed sensor as claimed in claim 1, wherein the shaft of the yoke member and the wheel shaft are separate shafts.

13. The wheel speed sensor as claimed in claim 1, wherein said bearing contacts the wheel shaft.

14. The wheel speed sensor as claimed in claim 1, wherein said housing and said carrier member together have a one-piece construction.

15. The wheel speed sensor as claimed in claim 1, wherein the wheel shaft supports the wheel.

* * * * *